United States Patent
Mostafa (10) Patent No.: US 10,581,792 B2
(45) Date of Patent: *Mar. 3, 2020

(54) STREAMING OF MEDIA IN A MULTIMEDIA MESSAGING SERVICE

(71) Applicant: Conversant Wireless Licensing S.a r.l., Luxembourg (LU)

(72) Inventor: Miraj Mostafa, Tampere (FI)

(73) Assignee: Conversant Wireless Licensing S.a r.l., Luxembourg (LU)

( * ) Notice: Subject to any disclaimer, the term of this patent is extended or adjusted under 35 U.S.C. 154(b) by 153 days.

This patent is subject to a terminal disclaimer.

(21) Appl. No.: 15/729,863

(22) Filed: Oct. 11, 2017

(65) Prior Publication Data

US 2018/0077107 A1   Mar. 15, 2018

Related U.S. Application Data

(63) Continuation of application No. 09/920,910, filed on Aug. 2, 2001, now Pat. No. 9,800,538.

(30) Foreign Application Priority Data

Aug. 2, 2000  (FI) ..................... 20001741

(51) Int. Cl.
    *H04L 12/58*  (2006.01)
    *H04L 29/06*  (2006.01)
    *H04L 29/08*  (2006.01)

(52) U.S. Cl.
    CPC .............. *H04L 51/38* (2013.01); *H04L 51/24* (2013.01); *H04L 65/4069* (2013.01);
    (Continued)

(58) Field of Classification Search
    CPC ... H04L 51/24; H04L 51/38; H04L 29/06027; H04L 65/608; H04L 65/4069
    See application file for complete search history.

(56) References Cited

U.S. PATENT DOCUMENTS

| 5,224,648 A | 7/1993 | Simon et al. |
| 5,513,126 A | 4/1996 | Harkins et al. |

(Continued)

FOREIGN PATENT DOCUMENTS

| EP | 0524909 A1 | 1/1993 |
| EP | 0662763 A2 | 7/1995 |

(Continued)

OTHER PUBLICATIONS

3rd Generation Partnership Project (3GPP) Technical Specification 23.140, V. 3.0.1, "Multimedia Messaging Services (MMS) Functional Description, Stage 2", 1999.

(Continued)

*Primary Examiner* — John M MacIlwinen
(74) *Attorney, Agent, or Firm* — Conversant Wireless Licensing (57) ABSTRACT

A communication method, comprising the steps of a sender 21 sending a message comprising at least one streamable component and information describing it to a communication server MMSC and the communication server responsively sending to a receiver 24 a notification message to notify about the availability of the streamable component. The notification message is a multimedia message comprising the description for the streamable component. The communication server MMSC and the receiver form a streaming session for transferring the streamable component using the information describing the streamable component. The communication server MMSC then streams the streamable component to the receiver 24 in sequential sub-parts in the streaming session. Corresponding to the method, a communication system 20, a communication server MMSC, a communication device 21, 24 and computer program products for them are also described.

16 Claims, 5 Drawing Sheets

(52) U.S. Cl.
CPC ............ *H04L 65/608* (2013.01); *H04L 67/02* (2013.01); *H04L 29/06027* (2013.01)

(56) References Cited

U.S. PATENT DOCUMENTS

| | | |
|---|---|---|
| 5,530,917 A | 6/1996 | Andersson et al. |
| 5,544,321 A | 8/1996 | Theimer et al. |
| 5,557,724 A | 9/1996 | Sampat et al. |
| 5,584,025 A | 12/1996 | Keithley et al. |
| 5,592,469 A | 1/1997 | Szabo |
| 5,617,539 A | 4/1997 | Ludwig et al. |
| 5,642,171 A | 6/1997 | Baumgartner et al. |
| 5,694,334 A | 12/1997 | Donahue et al. |
| 5,717,955 A | 2/1998 | Swinehart |
| 5,737,011 A | 4/1998 | Lukacs |
| 5,740,384 A | 4/1998 | Asthana et al. |
| 5,745,782 A | 4/1998 | Conway |
| 5,751,704 A | 5/1998 | Kostic et al. |
| 5,778,187 A | 7/1998 | Monteiro et al. |
| 5,848,415 A | 12/1998 | Guck |
| 5,854,898 A | 12/1998 | Riddle |
| 5,901,287 A | 5/1999 | Bull et al. |
| 5,918,002 A | 6/1999 | Klemets et al. |
| 5,996,022 A | 11/1999 | Krueger et al. |
| 6,006,227 A | 12/1999 | Freeman et al. |
| 6,014,706 A | 1/2000 | Cannon et al. |
| 6,029,195 A | 2/2000 | Herz |
| 6,047,051 A | 4/2000 | Ginzboorg et al. |
| 6,052,735 A | 4/2000 | Ulrich et al. |
| 6,085,222 A | 7/2000 | Fujino et al. |
| 6,094,661 A | 7/2000 | Salomaki |
| 6,105,036 A | 8/2000 | Henckel |
| 6,134,235 A | 10/2000 | Goldman et al. |
| 6,134,313 A | 10/2000 | Dorfman et al. |
| 6,163,809 A | 12/2000 | Buckley |
| 6,167,040 A | 12/2000 | Haeggstrom |
| 6,167,261 A | 12/2000 | Amin |
| 6,172,673 B1 | 1/2001 | Lehtinen et al. |
| 6,173,328 B1 | 1/2001 | Sato |
| 6,181,714 B1 | 1/2001 | Isaksson et al. |
| 6,199,099 B1 | 3/2001 | Gershman et al. |
| 6,200,216 B1 | 3/2001 | Peppel |
| 6,211,869 B1 | 4/2001 | Loveman et al. |
| 6,216,013 B1 | 4/2001 | Moore et al. |
| 6,233,318 B1 | 5/2001 | Picard et al. |
| 6,236,909 B1 | 5/2001 | Colson et al. |
| 6,249,844 B1 | 6/2001 | Schloss et al. |
| 6,260,050 B1 | 7/2001 | Yost et al. |
| 6,263,371 B1 | 7/2001 | Geagan et al. |
| 6,269,483 B1 | 7/2001 | Broussard |
| 6,301,482 B1 | 10/2001 | Shohara |
| 6,308,171 B1 | 10/2001 | De La Huerga |
| 6,314,094 B1 | 11/2001 | Boys |
| 6,314,302 B1 | 11/2001 | Haferbeck et al. |
| 6,314,457 B1 | 11/2001 | Schena et al. |
| 6,317,584 B1 | 11/2001 | Abu-Amara et al. |
| 6,317,795 B1 | 11/2001 | Malkin et al. |
| 6,330,244 B1 | 12/2001 | Swartz et al. |
| 6,341,288 B1 | 1/2002 | Yach et al. |
| 6,356,529 B1 | 3/2002 | Zarom |
| 6,363,411 B1 | 3/2002 | Dugan et al. |
| 6,366,554 B1 | 4/2002 | Isaksson et al. |
| 6,377,996 B1 | 4/2002 | Lumelsky et al. |
| 6,385,451 B1 | 5/2002 | Kalliokulju et al. |
| 6,389,473 B1 | 5/2002 | Carmel et al. |
| 6,396,907 B1 | 5/2002 | Didcock |
| 6,411,807 B1 | 6/2002 | Amin et al. |
| 6,415,439 B1 | 7/2002 | Randell et al. |
| 6,421,707 B1 | 7/2002 | Miller et al. |
| 6,430,177 B1 | 8/2002 | Luzeski et al. |
| 6,446,130 B1 | 9/2002 | Grapes |
| 6,456,594 B1 | 9/2002 | Kaplan et al. |
| 6,466,971 B1 | 10/2002 | Humpleman et al. |
| 6,469,714 B2 | 10/2002 | Buxton et al. |
| 6,469,998 B1 | 10/2002 | Burgaleta Salinas et al. |
| 6,498,865 B1 | 12/2002 | Brailean et al. |
| 6,501,741 B1 | 12/2002 | Mikkonen et al. |
| 6,510,153 B1 | 1/2003 | Inoue et al. |
| 6,522,638 B1 | 2/2003 | Haugli et al. |
| 6,522,875 B1 | 2/2003 | Dowling et al. |
| 6,526,580 B2 | 2/2003 | Shimomura et al. |
| 6,538,623 B1 | 3/2003 | Parnian et al. |
| 6,539,118 B1 | 3/2003 | Murray et al. |
| 6,542,819 B1 | 4/2003 | Kovacs et al. |
| 6,546,005 B1 | 4/2003 | Berkley et al. |
| 6,549,612 B2 | 4/2003 | Gifford et al. |
| 6,553,412 B1 | 4/2003 | Kloba et al. |
| 6,557,001 B1 | 4/2003 | Dvir et al. |
| 6,567,667 B1 | 5/2003 | Gupta et al. |
| 6,584,146 B2 | 6/2003 | Bose et al. |
| 6,587,457 B1 | 7/2003 | Mikkonen |
| 6,594,238 B1 | 7/2003 | Wallentin et al. |
| 6,600,917 B1 | 7/2003 | Maupin |
| 6,606,479 B2 | 8/2003 | Cook et al. |
| 6,608,832 B2 | 8/2003 | Forslow |
| 6,611,674 B1 | 8/2003 | Jokimies et al. |
| 6,625,274 B1 | 9/2003 | Hoffpauir et al. |
| 6,629,130 B2 | 9/2003 | Mertama et al. |
| 6,633,906 B1 | 10/2003 | Callaway et al. |
| 6,636,256 B1 | 10/2003 | Passman et al. |
| 6,636,733 B1 | 10/2003 | Helferich |
| 6,643,284 B1 | 11/2003 | Inoue et al. |
| 6,647,535 B1 | 11/2003 | Bozdagi et al. |
| 6,654,601 B2 | 11/2003 | Picoult et al. |
| 6,658,254 B1 | 12/2003 | Purdy et al. |
| 6,658,485 B1 | 12/2003 | Baber et al. |
| 6,674,733 B1 | 1/2004 | Huusko |
| 6,677,858 B1 | 1/2004 | Faris et al. |
| 6,678,361 B2 | 1/2004 | Rooke et al. |
| 6,693,915 B1 | 2/2004 | Lappetelaine et al. |
| 6,714,778 B2 | 3/2004 | Nykanen et al. |
| 6,718,551 B1 | 4/2004 | Swix et al. |
| 6,725,038 B1 | 4/2004 | Subbiah |
| 6,728,753 B1 | 4/2004 | Parasnis et al. |
| 6,731,940 B1 | 5/2004 | Nagendran |
| 6,738,800 B1 | 5/2004 | Aquilon et al. |
| 6,744,761 B1 | 6/2004 | Neumann et al. |
| 6,760,324 B1 | 7/2004 | Scott et al. |
| 6,763,388 B1 | 7/2004 | Tsimelzon |
| 6,771,964 B1 | 8/2004 | Einola et al. |
| 6,772,212 B1 | 8/2004 | Lau et al. |
| 6,784,899 B1 | 8/2004 | Barrus et al. |
| 6,792,273 B1 | 9/2004 | Tellinger et al. |
| 6,795,711 B1 | 9/2004 | Sivula |
| 6,850,614 B1 | 2/2005 | Collins |
| 6,859,882 B2 | 2/2005 | Fung |
| 6,898,207 B2 | 5/2005 | Boasson et al. |
| 6,917,965 B2 | 7/2005 | Gupta et al. |
| 6,938,268 B1 | 8/2005 | Hodge |
| 6,963,783 B1 | 11/2005 | Bi et al. |
| 6,968,366 B1 | 11/2005 | Zhang et al. |
| 6,976,082 B1 | 12/2005 | Ostermann et al. |
| 7,000,107 B2 | 2/2006 | Hewett et al. |
| 7,028,264 B2 | 4/2006 | Santoro et al. |
| 7,047,305 B1 | 5/2006 | Brooks et al. |
| 7,062,765 B1 | 6/2006 | Pitzel et al. |
| 7,065,553 B1 | 6/2006 | Chesley et al. |
| 7,069,573 B1 | 6/2006 | Brooks et al. |
| 7,073,191 B2 | 7/2006 | Srikantan et al. |
| 7,113,780 B2 | 9/2006 | McKenna et al. |
| 7,152,092 B2 | 12/2006 | Beams et al. |
| 7,190,681 B1 | 3/2007 | Wu |
| 7,200,385 B1 | 4/2007 | Wallenius et al. |
| 7,209,949 B2 | 4/2007 | Mousseau et al. |
| 7,249,344 B1 | 7/2007 | Zeanah et al. |
| 7,284,187 B1 | 10/2007 | Corboy |
| 8,150,989 B2 | 4/2012 | Mostafa |
| 2001/0003191 A1 | 6/2001 | Kovacs et al. |
| 2002/0016818 A1 | 2/2002 | Kirani et al. |
| 2002/0045808 A1 | 4/2002 | Ford et al. |
| 2002/0049852 A1 | 4/2002 | Lee et al. |
| 2002/0054090 A1 | 5/2002 | Silva et al. |
| 2002/0073172 A1 | 6/2002 | Armstrong et al. |
| 2002/0073205 A1 | 6/2002 | Mostafa |

(56) References Cited

U.S. PATENT DOCUMENTS

| | | |
|---|---|---|
| 2002/0111907 A1 | 8/2002 | Ling |
| 2002/0120939 A1 | 8/2002 | Wall et al. |
| 2002/0126708 A1 | 9/2002 | Skog et al. |
| 2002/0194130 A1 | 12/2002 | Maegawa et al. |
| 2002/0196127 A1 | 12/2002 | Benson |
| 2003/0195976 A1 | 10/2003 | Shiigi |
| 2003/0219030 A1 | 11/2003 | Gubbi |
| 2004/0158853 A1 | 8/2004 | Doi et al. |
| 2004/0162125 A1 | 8/2004 | Tarlie |
| 2005/0033632 A1 | 2/2005 | Wu et al. |
| 2005/0120082 A1 | 6/2005 | Hesselink et al. |
| 2005/0246624 A1 | 11/2005 | Humpleman et al. |
| 2005/0246752 A1 | 11/2005 | Liwerant et al. |
| 2006/0031237 A1 | 2/2006 | DeAnna et al. |
| 2006/0045030 A1 | 3/2006 | Bieselin |
| 2008/0146272 A1 | 6/2008 | Rao et al. |
| 2009/0070485 A1 | 3/2009 | Barger et al. |
| 2013/0117394 A1 | 5/2013 | Salmi et al. |

FOREIGN PATENT DOCUMENTS

| | | |
|---|---|---|
| EP | 08097854 A | 4/1996 |
| EP | 0748121 A2 | 12/1996 |
| EP | 0845894 A3 | 9/1999 |
| EP | 0984584 A1 | 3/2000 |
| EP | 0993148 A2 | 4/2000 |
| JP | 9-311831 A | 12/1997 |
| JP | 10-040258 | 2/1998 |
| JP | 10040188 A | 2/1998 |
| JP | 10240463 A | 9/1998 |
| JP | 10240643 A | 9/1998 |
| JP | 10313338 A | 11/1998 |
| JP | 411274993 | 10/1999 |
| JP | 11328063 A | 11/1999 |
| JP | 2000222302 A | 8/2000 |
| JP | 2000232530 A | 8/2000 |
| JP | 2002-34014 A | 9/2000 |
| JP | 2001005751 A | 12/2001 |
| JP | 2002-034014 A | 1/2002 |
| WO | 94/11858 A1 | 5/1994 |
| WO | 94/11981 A1 | 5/1994 |
| WO | 97/14244 | 4/1997 |
| WO | 98/03005 | 1/1998 |
| WO | 98/15091 | 4/1998 |
| WO | 98/19438 | 5/1998 |
| WO | 98/26592 | 6/1998 |
| WO | 98/54637 | 12/1998 |
| WO | 00/11847 | 8/1999 |
| WO | 99/56431 | 11/1999 |
| WO | 99/62258 | 12/1999 |
| WO | 99/66746 | 12/1999 |
| WO | 00/11847 | 3/2000 |
| WO | 00/16541 | 3/2000 |
| WO | 00/40007 | 7/2000 |
| WO | 00/42755 | 7/2000 |
| WO | 00/56088 | 9/2000 |
| WO | 00/64110 | 10/2000 |
| WO | 02/11398 A1 | 2/2002 |

OTHER PUBLICATIONS

3G TS 23.140 version 3.0.1 Release 1999, "Universal Mobile Telecommunications Systems (UMTS); Multimedia Messaging Service (MMS), Functional description", Stage 2, pp. 1-26, Mar. 2000.
International Search Report for PCT/IB2002/001431, dated Jul. 5, 2002, 3 pp.
International Search Report for PCT/F100/00965, dated Feb. 13, 2001, 4pp.
Perkowitz et al., "Adaptive Web Sites: Automatically Synthesizing Web Pages, AAAI '98, Proceedings of the Fifteenth National Conference on Artificial Intelligence", Jul. 26-30, 1998, pp. 727-732, Madion, WI (http://www.aaai.org/Library/AAA/1998/aaai98-103.php).
Karmouch et al., "Agent Based Multimedia Communication on Internet", IEEE Canadian Conference on Electrical and Computer Engineering, May 25-28, 1998, pp. 734-737, Waterloo, Ont.
Betti et al., "A Burst Level Error Generation Model for 2GHZ Personal Radio Communications", IEEE Vehicular Technology Conference, Sep. 19-22, 1999, pp. 102-106, Amsterdam, NL.
Perkins et al., "Handling Multimedia Data for Mobile Computers", COMPSAC '96, Proceedings of 20th International Computer Software and Applications Conference, Sep. 21-23, 1999, pp. 102-106, Amsterdam, NL.
Voruganti et al., "Intelligent Decision Aids for 21st C4I Architectures", MILCOM 97 Proceedings, Nov. 3-5, 1997, pp. 618-622, Monterey, CA.
Bacon et al., "Location-Oriented Multimedia", IEEE Personal Communications, Oct. 1997, pp. 48-57, vol. 4, Issue 5.
Liao, W. "Mobile Internet Telephony Protocol:an Application Layer Protocol for Mobile Internet Telephony Services", ICC '99, 1999 IEEE International Conference on Communications, Jun. 6-10, 1999, pp. 339-343, Vancouver, BC.
Angin et al., "The Mobileware Toolkit:Programmable Support for Adaptive Mobile Networking", IEEE Personal Communications, Aug. 1998, pp. 32-43, vol. 5, No. 4.
Ducey, R.V., "Multimedia Broadcasting and the Internet", INET'96, The 6th Annual Conference of the Internet Society, Jun. 25-28, 1996, pp. 1-10, Montreal, CA.
Meggers et al., "A Multimedia Communication Architecture for Handheld Devices", The Ninth IEEE International Symposium on Personal, Indoor and Mobile Radio Communications, Sep. 8-11, 1998, pp. 1245-1249, Boston, MA.
Friedman et al., "Navigational Plans for Data Integration", AAAI '99, Proceedings of the Sixteenth National Conference on Artificial Intelligence, Jul. 18-22, 1999, pp. 67-73, Orlando FL (http://www.aaai.org/Library/AAAI/1999/aaai99-010.php).
Simeonov, P.L., "On Using Nomadic Services for Distributed Intelligence", The Eight IEEE International Conference on Computer Communications and Networks, Oct. 11-13, 1999, pp. 228-231, Boston, MA.
Wu et al., "Personal Mobile Multimedia Communications in a Wireless WAN Environment", IEEE First Workshop on Multimedia Signal Processing, Jun. 23-25, 1997, pp. 389-394, Princeton, NJ.
Kornegay et al., "Quality of Service and System Design", IEEE Computer Society Workshop on VLSI, Apr. 8-9, 1999, pp. 112-117, Orlando, FL.
Lassila et al., "Resource Description Framework (RDF) Model and Syntax Specification", W3C Recommendation, Feb. 22, 1999, (http://www.w3.org.TR/1999/REC-rdf-syntax-19990222).
Tennenhouse et al., "The SpectrumWare Approach to Wireless Signal Processing", Wireless Networks Journal, Jan. 1966, pp. 1-12, vol. 2, Issue 1, Kluwer Academic Publishers, Hingham, MA.
Kraver, T., "Summary Report of Research Task Group Reports", Arizona Learning Technology Partnership, Nov. 23, 1997 (http://www.altp.org/SSP/SummaryofResearchTaskForceReports.htm).
Oono et al., "The Proposal of Wireless Multimedia Communication System with Integration of Packet-Switched and Circuit-Switched Channels", GLOBECOM 1998, The Bridge to Global Integration, IEEE Global Telecommunications Conference, Nov. 8-12, 1998, pp. 120-125, Sydney, NSW.
Hjelm et al., "WAP Forum-W3 Cooperation White Paper", W3C Note, Oct. 30, 1998, (http://www.w3.org/TR/1998/NOTE-WAP-19981030).
Jokela, P., "Wireless Internet Access Using Anonymous Access Methods", MoMuC '99, IEEE International Workshop on Mobile Multimedia Communications, Nov. 15-17, 1999, pp. 194-197, San Diego, CA.
Singh et al., "Unified Messaging Using SIP and RTSP", IPTS 200, Sep. 11, 2000, pp. 1-7, Atlanta, GA.
Schlzrinne et al., RFC 2326 "Real Time Streaming Protocol (RTSP)", Apr. 1998, pp. 1-92.
Sevanto, J., "Multimedia Messaging Service for GPRS and UMTS", Wireless Communications and Networking Conference, 1999, WCNC, 1999 IEEE, vol. 3, pp. 1422-1426, Sep. 24, 1999.

(56) References Cited

OTHER PUBLICATIONS

Ekudden, Erik et al., "On-demand Mobile Media—A Rich Service Experience for Mobile Users", Ericsson Review No. 4, 2001, pp. 168-177.

Miraj-E-Mostafa, "Circuit Switched Mobile Multimedia Telephony—Terminal Requirements and Call Control", Third International Symposium on Wireless Personal Multimedia Communications, WPMC'00 Proceedings, vol. 2, Nov. 12, 2000-Nov. 15, 2000, pp. 994-999, Bangkok, Thailand.

Seiji Okumura et al., "The Method of the QoS Control on a MPEG-4 over RTP Delivery System", Multimedia, Distributed, Cooperative and Mobile (DICOMO 2000) Symposium, vol. 2000, No. 7, Information Processing Society of Japan, Jun. 28, 2000, pp. 433-438.

3rd Generation Technical Specification Group Terminals; Multimedia Messaging Service Partnership Project (MMS); Functional Description; Stage 2 (Release 4) 3GPP TS 23.140 V4.1.0 (Dec. 2000).

3rd Generational Technical Specification Group Services and System Aspects; Packet-switched Partnership Project Streaming Services (PSS); General Description (Release 4) 3GPP TS 26.233 V1.0.0 (Dec. 2000).

3rd Generation Technical Specification Group Services and System Aspects; Packet-switched Partnership Project Streaming Services (PSS); Protocols and Codecs (Release 4) 3GPP TS 26.234 V1.0.0 (Dec. 2000).

WAP-209 MMS Encapsulation—WAP MMS Message Encapsulation—Proposed Version Feb. 17, 2000, Wireless Application Protocol Forum Ltd. 2000.

Journal of the Audio Engineering Society, vol. 48, Jul.-Aug. 2000, USA, Xu et al., "Real-Time Streaming of Multichannel Audio Data over Internet", pp. 627-641.

Handley et al., "SDP: Session Description Protocol", RFC 2327 (http://tolls.ietf.org/pdf/rfc2327) Apr. 1998.

EPO Communication dated Nov. 11, 2004.

JP Decision Rejection dated Oct. 21, 2004.

3GPP TS 23.140, V 4.2.0 (Mar. 2001), 3rd Generation Partnership Project; Technical Specification Group Terminals' Multimedia Messaging Service (MMS); Functional description; Stage 2 (Release 4); Section 61.7, p. 23.

PRIOR ART

STREAMING OF MEDIA IN A MULTIMEDIA MESSAGING SERVICE

CROSS-REFERENCE TO RELATED APPLICATIONS

The present application is a continuation of application Ser. No. 09/920,910, filed Aug. 2, 2001, which claims the priority of Finnish Patent Application No. 20001741, filed Aug. 2, 2000, now Finnish Patent No. 112307. The disclosures of all of the above applications are hereby incorporated herein in their entirety by reference.

FIELD OF THE INVENTION

This invention relates to communication services. It is related particularly, but not exclusively, to streaming in a Multimedia Messaging Service (MMS).

BACKGROUND OF THE INVENTION

Electronic mail, or e-mail is a messaging service, which allows quick and economical communication in electronic form. Using the Internet, e-mail messages can be sent all over the world, in many cases practically free of charge. Furthermore, the same e-mail message can be sent to a plurality of recipients. This technique is called multicasting. As the relaying of e-mail messages is entirely automated, the e-mail messages can arrive very shortly after they are sent. E-mail messages can carry computer files such as documents, program files, and different media files like audio- or video clips.

Ordinary home users having Personal Computers (PCs) prefer not to have a permanent connection to their e-mail system (for example to the Internet) but rather to set up a temporary and remote connection to an e-mail server that stores messages received since a previous e-mail message reading session. Using this kind of connection and an e-mail message reading program, new e-mail messages can be transferred from the e-mail server to the memory or a hard disk of a PC and then be read either while the connection is still extant, or alternatively after the connection has been closed. The transmission of data between the PC and the e-mail server is typically carried out using a modem attached to the PC.

In the following, the term "sender" refers to a device that sends data intended for a receiver and "receiver" refers to a device that receives the data and to which the data was intended.

Figure 1:
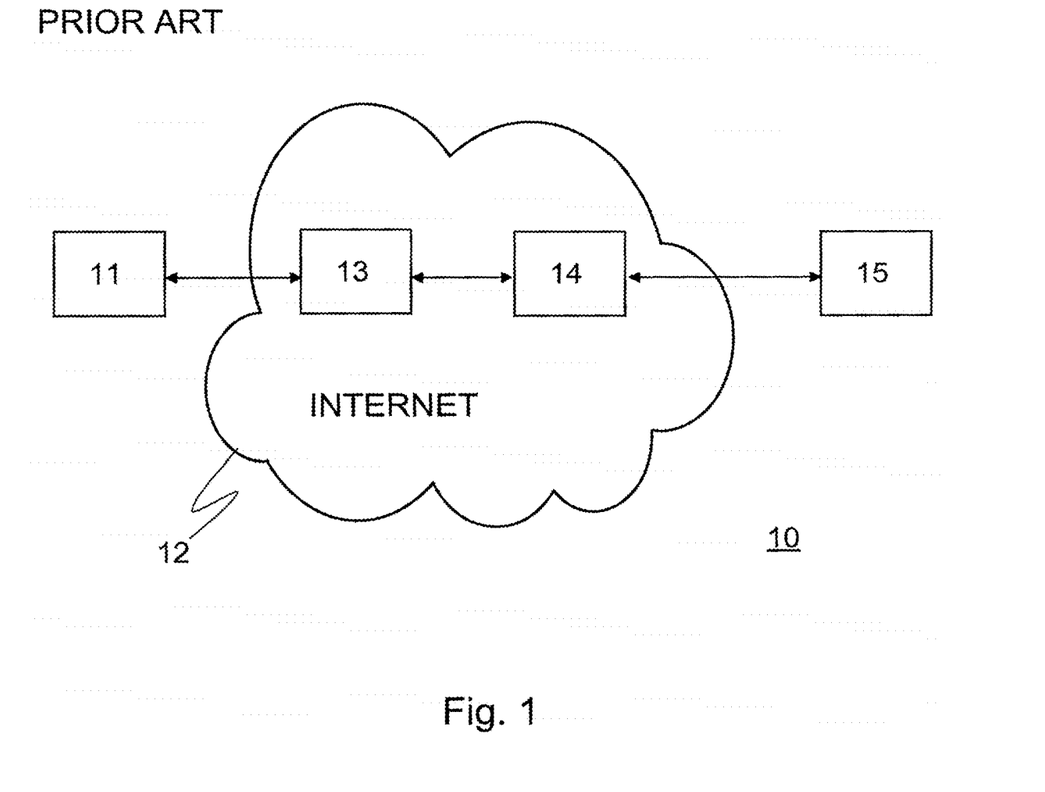
FIG. 1 is a schematic diagram of an Internet-based e-mail system.

FIG. 1 shows a schematic diagram of an Internet-based e-mail system 10 comprising a sender 11, a receiver 15 and the Internet 12 having a sender's e-mail server 13 and a receiver's e-mail server 14.

In the Internet, e-mail messages are sent using certain well-known protocols. Simply speaking, an e-mail message, once composed, is packaged into a single unit, stamped with an address of the receiver and is sent to the sender's e-mail server. The sender's e-mail server forwards the message through the Internet to the receiver's e-mail server. The next time the receiver forms a connection to the receiver's e-mail server via the Internet and checks whether new e-mail messages have been received using an e-mail reading program, the receiver can download any newly received e-mail message over the connection (e.g. modem link). When the e-mail message has been received completely, it can be presented to the user. It should be noted that during the various stages of its transmission, the e-mail message is typically split into numerous smaller packets according to the data transfer protocol(s) used. On reception, the receiver gathers together all of the packets, assembles them into the correct order (if necessary) and reconstructs the e-mail message into its original form, before presenting the e-mail message to a user of the receiver.

An e-mail transmission system described above is convenient and provides the possibility for multicasting, but it is best suited, and originally intended, for receiving e-mail messages and then presenting them at the convenience of the user. Thus, the content of a given e-mail message can only be accessed after completion of the e-mail message transmission to the receiver. This is not a real problem with plain text form e-mail messages, but in the case of a large media or multimedia content (clip) it is a drawback that the user of the receiver cannot start presentation of the clip while it is still being downloaded. Another drawback is that in order to receive an e-mail message, the receiver must have a sufficiently large memory to accommodate the entire message. Particularly in mobile communications networks, or any other network in which part of the communications link is formed by a radio connection, it is also problematic to receive a long e-mail message without interruptions or errors, for example due to a temporary loss of or deterioration in radio coverage. Mobile terminals also tend to have limited memory available for the storage of received e-mail messages, which further exacerbates the problem associated with the accommodation of messages in the receiver. These problems are at least partly mitigated by the Multimedia Messaging Service (MMS).

The MMS is a new end-to-end messaging approach for one-way transmission of multimedia messages having text and/or multimedia content. MMS provides the possibility of sending multimedia messages between mobile users and between a mobile user and the Internet. There is already an agreed solution for implementation of MMS in 3rd Generation mobile communication networks. The currently specified features of the proposed MMS are described in 3rd Generation Partnership Project (3GPP) technical specification 23.140 V.3.0.1. "Multimedia Messaging Service (MMS), Functional Description, Stage 2 (Release 1999)". The MMS proposed in 3GPP 23.140 employs a store-and-forward approach to multimedia message delivery. Multimedia messages are constructed in such a way that the media content, information necessary to describe the media content and addressing information, identifying the intended receiver of the multimedia message, are encapsulated together. The multimedia message is then sent to an MMS Centre MMSC, which in turn notifies the receiver about the multimedia message. The multimedia message is downloaded by the receiving terminal as a whole and only presented to the user once downloaded and stored in the receiving terminal.

It should be appreciated that although the term "multimedia message" is used generally to describe a message that contains more than one type of content, in this application, the term extends to cover messages that contain only one media type.

As currently specified, the MMS has a drawback: the receiving terminal must store the multimedia message before it can be presented to the user. Therefore the size of the memory of the receiving terminal sets an upper limit on the size of multimedia messages that can be downloaded. WO 99/166746 solves this problem by dividing a message into sub-messages (segments) if the entire message would not fit into the memory of the receiving terminal. These sub-messages are small enough so that the receiving terminal can individually download each of them as a whole. In that case, the receiving terminal initially downloads a first sub-message. After the first sub-message has been fully downloaded, the receiving terminal can present it. After presentation of the first sub-message, the receiving terminal can download a second sub-message and then present it. Each sub-message is downloaded and then presented by itself. The size of the sub-messages depends on the memory size of the receiving terminal and must be small enough to fit into the memory.

Apart from MMS, there are streaming-techniques used in the Internet for transmission over fixed lines. "Streaming" is a term used generally to describe the presentation of a media stream, for example an audio or video stream, or a combination of different streams, in a continuous way while this stream or those streams are being transmitted to a client over a data network. A "stream" is a flow of data typically enabling the receiver to present some continuous data such as a motion picture, voice or music. In a typical video stream, some 10 to 20 video frames are transmitted per second. In practice, streaming can be either live (real-time) or performed in an on-demand fashion. As its name suggests, "live streaming" describes the creation of a media stream from a live source, for example a stream of digital images produced by a video camera, while "on-demand streaming" describes the creation of a media stream from, for example, a file stored on a server. Streaming also involves establishing a streaming session, during which the stream or streams is or are transmitted to the client.

Within streaming there are two very important functionalities, namely streaming control and media transport. Streaming control takes care of establishing, managing and terminating a streaming session using a negotiated or pre-configured set of parameter values. Media transport concerns the transportation of media during the established session using an agreed or negotiated transport protocol. For example, there are widely agreed protocols in the Internet to provide both streaming control and media transport functionalities and these can be used as transport protocols in streaming applications.

Whilst streaming is widely used in the Internet, it has still to be adapted for use in mobile communication networks. It should be appreciated that the use of streaming is desirable in mobile networks, since mobile terminals typically have limited storage capacity (memory). However, present mobile communication networks do not support streaming for reasons described in the following.

The encapsulation of media content, message description and addressing information in a single entity as proposed in current MMS specifications is incompatible with the streaming of media content. In order to establish a streaming session, it is necessary for the receiving terminal to be aware, in advance, of certain information relating to the media content. Such information includes, but is not limited to, the type of media contained in the multimedia message, the way that media is encoded and a suitable transport protocol that can be used to download the media content. Because present MMS specifications require information describing the media content to be encapsulated with the multimedia message itself, the receiving terminal cannot obtain prior knowledge about the properties of the media content and therefore cannot establish any form of streaming session. Thus, according to the present MMS specification, the entire multimedia message must be downloaded to the receiving terminal in order for the details of the media content to be extracted. Only then can any media content, such as video and/or audio clips be played back to the user of the receiving terminal. This limits the usability of the present MMS because multimedia clips are usually bulky in terms of bits and therefore a receiving terminal, for example a mobile station, would require a comparatively large memory to completely receive the clips. The need to download an entire multimedia message before it can be presented may also give rise to significant delays in certain conditions, for example if the multimedia message is very large, or the data transmission rate of the connection is low.

It should further be emphasised that the addressing scheme suggested by current MMS specifications does not facilitate the implementation of streaming in such a system. The current MMS can be viewed as a "sender orientated" system. In other words, the sender decides what media content to send to the receiver, encapsulates that in the multimedia message and addresses the multimedia message to the intended receiver. Streaming, on the other hand, is more "receiver orientated". To establish a streaming session, it is generally necessary for a streaming connection to be formed between the receiver and the sender, for example a network-based server, the content being streamed from the server once the necessary connection has been established. Thus, establishment of a streaming session requires the recipient to have knowledge of the location of the media content, but it does not necessarily require the media content to be directly addressed to the recipient.

SUMMARY OF THE INVENTION

Now a new solution has been invented where the problems of the prior art can be avoided or at least mitigated.

According to a first aspect of the invention there is provided a communication method comprising the steps of:
receiving by a communication server content and information describing the content from a first terminal; and
sending a notification message from the communication server to a second terminal, the notification message notifying about availability of the content; characterised by the method further comprising:
forming a streaming session between the communication server and the second terminal, using the information describing the content; and
transmitting the content in sequential sub-parts from the communication server to the second terminal, during the streaming session.

The transmission of the content to the second terminal as a stream allows rapid access to the content as a recipient using the second terminal need not wait for the content to be received completely.

Preferably, the content and the information describing the content are sent from the first terminal to the communication server in separate messages. This allows, for example, separate sending of the content to one entity of the communication server and sending of a notification message to the recipients.

Preferably, the information describing the content is sent from the communication server to the second terminal within the notification message.

Preferably, the method further comprises sending by the communication server to the second terminal the information describing the content as a media component of a multimedia message.

The sending of the description of the streamable component as a media component allows utilising of existing multimedia messaging systems with minor changes. It further allows embedding in the same multimedia message more than one media components, wherein some or all of the media components may be descriptions of streamable components.

Preferably, the multimedia message comprises at least one non-streamable component and at least one description of a streamable component.

Preferably, the communication method further comprises the step of presenting at the second terminal the received content as a stream during the streaming session. The second terminal can start presenting the content immediately and possibly take certain measures (for example, pausing or aborting the data transmission) during the transmission.

Preferably, the method further comprises the step of deciding at the second terminal to receive or not to receive the content, at a certain time, and the streaming session is only formed if the decision is to receive the content.

Preferably, the communication server comprises a content server for storing and transmitting the content and a notification server for receiving and transmitting notifications, wherein the content server and the notification server have a physical relationship selected from the group consisting of the following: a single unit, separate units, and separate units distributed at different geographic locations.

Preferably, the communication method further comprises the step of generating the content at the first terminal. Preferably, content generated at the first terminal is streamed to the content server and the sending of the content occurs during the generation of the content. By doing so the content can be made available to the user earlier than if content was generated wholly or to a large extent in the first terminal and only then streamed to the content server.

Preferably, when using streamed content generation, the information describing. The content is sent before content generation is complete, so that the second terminal can start receiving the content before its generation is complete.

Preferably, during the streaming session between the communication server and the second terminal, the receiver can issue an abort command to abort the session. Preferably, the streaming session is aborted in response to the abort command.

Preferably, the notification message comprises information required by the second terminal in order to form a streaming session with the content server.

Preferably, the method is implemented as part of the Multimedia Messaging Service (MMS).

Preferably, the method further comprises the step of multicasting the content to at least one other terminal in addition to the second terminal in at least one other streaming session.

In an embodiment in which there are a plurality of streaming sessions, each of the streaming sessions may be formed independently of any other, so that the sessions may start and end at different times or at the same time. Preferably, each of the sessions can be aborted independently of any other, responsive to each of the respective terminals.

According to a second aspect of the invention there is provided a communications system comprising:
 a plurality of terminals including a first terminal and a second terminal; a communication server accessible to the plurality of terminals;
 means for sending the content and information describing the content from the first terminal to the communication server; and
 means for sending a notification message from the communication server to the second terminal;
 characterised by the system further comprising means for forming a streaming session between the communication server and the second terminal, using the information describing the content; and
 means for transmitting the content in sequential sub-parts from the communication server to the second terminal, during the streaming session.

Preferably, the system further comprises means for generating the content at a first terminal.

Preferably, the system further comprises means for presenting at the second terminal the received content as a stream, during the streaming session.

According to a third aspect of the invention there is provided a communication server for serving a plurality of terminals, the communication server comprising:
 means for receiving content and information describing the content from a first terminal; and
 means for sending a notification message to a second terminal, the notification message notifying the second terminal about availability of the content;
 characterised by the server further comprising:
 means for forming a streaming session with the second terminal, using the information describing the content; and
 means for transmitting the content in sequential sub-parts to the second terminal, during the streaming session.

According to a fourth aspect of the invention there is provided a computer program product comprising:
 computer program code for causing a communication server to receive content and information describing the content from a first terminal to a communication server; and
 computer program code for causing the communication server to send a notification message from the communication server to a second terminal, the notification message notifying the second terminal about availability of the content; characterised by the computer program product further comprising:
 computer program code for causing the communication server to form a streaming session between the communication server and the second terminal, using the information describing the content; and
 computer program code for causing the communication server to transmit the content in sequential sub-parts from the communication server to the second terminal, during the streaming session.

According to a fifth aspect of the invention there is provided a communication device comprising:
 means for receiving from a communication server information describing a message intended for the communication device;
 characterised by the message comprising a streamable component;
 the information describing the message comprising information describing the streamable component; and
 the communication device further comprising:
 means for forming a streaming session with the communication server for receiving the streamable component, using the information describing the streamable component; and means for receiving the content in sequential sub-parts from the communication server.

According to a sixth aspect of the invention there is provided a computer program product comprising:
 computer program code for causing a communication device to receive
 from a communication server information describing a message intended for the communication device;
 characterised by the message comprising a streamable component;

the information describing the message comprising information describing the streamable component; and the computer program product further comprising:

computer program code for causing the communication device to form, using the information describing the streamable component, a streaming session with the communication server for receiving the streamable component; and computer program code for causing the communication device to receive the content in sequential sub-parts from the communication server.

Preferably, the communication device is a wireless communication device. Even more preferably, the communication device is a mobile telephone. In an alternative embodiment, the wireless communication device is a wireless communication adapter adapted for providing wireless communication functionality to an external device such as a laptop PC.

According to a seventh aspect there is provided a method in a communication device, the method comprising the steps of:

receiving from a communication server information describing a message intended for the communication device;

characterised by the message comprising a streamable component;

the information describing the message comprising information describing the streamable component; and the method further comprising:

forming a streaming session with the communication server for receiving the streamable component, by using the information describing the streamable component;

and presenting the streamable component during the streaming session.

The embodiments of one aspect also apply to various other aspects of the invention. In sake of brevity, all the embodiments have not been repeated in connection with every aspect of the invention. A skilled reader will appreciate the advantages of the various aspects and embodiments based on the advantages of the first aspect and its embodiments.

BRIEF DESCRIPTION OF THE DRAWINGS

The invention will now be described, by way of example only, with reference to the accompanying drawings, in which.

DETAILED DESCRIPTION

FIG. 1 has been described already in the foregoing.

Next, a preferred embodiment of the invention is briefly summarised and then fully disclosed with reference to FIGS. 2 to 6.

According to a preferred embodiment of the invention, streaming is incorporated within the Multimedia Messaging Service (MMS). A three-phase approach is taken in this regard. In a first phase (phase 1), a sender (sending terminal) transfers a multimedia message, or more accurately, media content, to a media (streaming) server. In a second phase (phase 2), one or more receivers (receiving terminals) is or are notified that media content is available for delivery. In a third phase (phase 3), the media content is transferred to the receiver or receivers. Advantageously, the notification performed in phase 2, takes place by means of a notification message sent from the sender via a Multimedia Messaging Server (MMS) to the receiver. Typically, the MMS server stores the notification message and then tries to forward it to the receiver. If it fails in the forwarding, it tries to re-send the stored notification message at a later time.

Advantageously, streaming is performed in the first and third phases, namely while uploading the media content to the media (streaming) server and while downloading the media content from the media (streaming) server. It should be noted that streaming during the uploading phase (phase 1) is not an essential feature of the method according to the invention. However, the use of streaming in both phases 1 and 3 can reduce the delay between starting transmission of the media content from the sender and the commencement of streaming at the receiver. It may also have the effect of reducing storage requirements in the media (streaming) server and can effectively enable implementation of real-time or near real-time streaming in the MMS.

Phase 2 of the method can be regarded as a message control phase, which takes care of forwarding a multimedia message and streaming-related information to a recipient (a target receiver of a multimedia message) via the MMS server. Phases 1 and 2 may be performed sequentially or substantially simultaneously, while phase 3 can be performed automatically on receipt of the notification message at the receiver, or at some later time at the discretion of a user of the receiver. Thus, the invention provides the flexibility to play the streamed media content at the receiver at any time. The preferred embodiment does not impose any limitation on the size of the media content or the number of recipients in the case of multicasting. The preferred embodiment is based on a store-and-forward approach and it is thus in-line with other MMS solutions. This enables any media content that is not to be streamed or is not of a type suitable for streaming to be downloaded to the receiver in a conventional manner that is as specified in current MMS specifications.

It is an advantage of the present invention that the implementation of streaming functionality can enhance the proposed MMS in many ways, particularly when the media content is large or it is to be multicast. The store-and-forward approach to streaming in MMS is effective and desirable, since it provides the receiver with complete flexibility to decide whether and when to receive and play back the media content within a multimedia message. The invention also provides streaming functionality within the framework of the proposed MMS and is thus fully compatible with the existing MMS standards.

The embodiments of the invention described hereafter outline the main steps for streaming under MMS.

Figure 2:
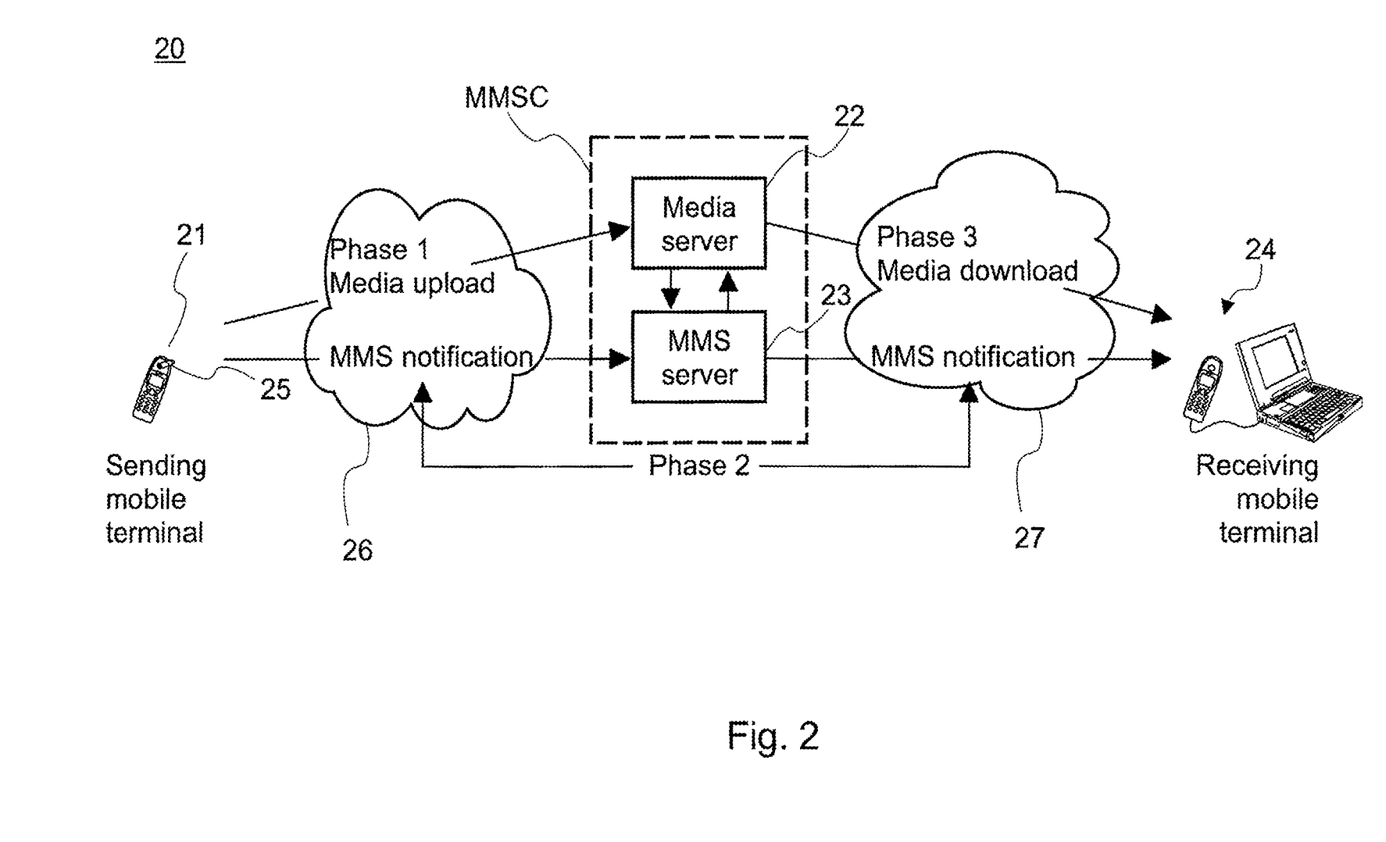
FIG. 2 is a diagram of a communication system according to a preferred embodiment of the invention.

FIG. 2 is a diagram of a communication system 20 according to a preferred embodiment of the invention. The system 20 comprises a sender 21, an MMS Centre (MMSC) having a media server 22 and an MMS server 23, and a receiver 24. The MMSC can also be referred to as a communication server.

In this example of a multimedia message streaming method, the sender 21 is a mobile terminal equipped with a video-camera 25 and a microphone (not shown) which creates media content (an audio/video clip) to be sent to the receiver 24. The receiver 24 is a mobile terminal equipped with appropriate presentation software and equipment to enable presentation of the media content (the audio/video clip). Typically, the sender 21 and the receiver 24 are similar devices, one of them being the sender 21 and another of the being the receiver 24 just because of their roles as sending and receiving parties (sender and recipient). The three phases of the method are described in detail in the following.

In the phase 1, the sender 21 establishes a streaming session with the media (streaming) server 22 which starts storing the media content in a predetermined location. This phase can be considered as a media upload phase.

In the phase 2, the sender 21 sends a notification via the MMS server 23 to the receiver 24 about the media content being stored. The notification includes presentation description information required to establish another streaming session between the receiver 24 and the media server 22. The presentation description information includes, but is not limited to, the following data: the network address of the media server, details of an access mechanism by use of which media content can be retrieved from the media server 22, the type of media to be streamed, the encoding method(s) used to encode the media content and an indication of the transport protocol(s) to be used for media downloading.

In the phase 3, the receiver 24 establishes a streaming session with the media server 22, based on the information received in the notification message and the receiver 24 starts to download and play the media. This phase can be considered as a media download phase. The media content is downloaded as a sequence of content sub-parts, each representing one time period of the streaming session. The content sub-parts may be separate data packets, or one sub-part may be comprised by more than one data packet, depending the type of coding of the media content and payload size of the data packets.

The media server 22 and the MMS server 23 can be merged together or maintained as different entities in the network depending on the implementation chosen by the service provider, which controls them. The media server 22 can be located, for example, in a mobile communications network or can reside in the Internet, possibly under the control of a service provider other than that responsible for provision of services in the mobile communications network.

When streaming is used both in the phase 1 and in the phase 3, the (notification) phase 2 is performed during the (media upload) phase 1 and the (media download) phase 3 can also be started during the phase 1. The sender 21 continues to send the media content to the media server 22 while the media server 22 simultaneously sends those parts of the media content received earlier to the receiver 24. The receiver 24 starts (and continues) playing back the media content with a total delay that depends on the streaming process, data transmission delays, and the time at which the phase 3 was initiated. If the phase 3 is not started automatically, but only after prompting and receiving permission from the user of the receiver 24, the total delay is typically longer than if the phase 3 were to be initiated immediately on notification being received at the receiver 24.

In an alternative embodiment the media content is already stored in the media server 22 and the sender 21 knows the presentation description information of the media content. In this case the phase 1 can be omitted. As stated above, streaming of media content is not essential to phase 1. For example, a non-streaming approach to phase 1 can be used in connection with the provision of media content from a commercial content provider, such as a provider of news content, located in a communications network, such as the Internet. The content provider updates the media content stored on the media server 22 using non-streaming transmission over an IP connection and notifies potential recipients of media content about new clips of interest, using notification messages according to phase 2 of the invention. The recipients of notification messages would be, for example, users having a subscription with the particular content provider. Based on the notification message, at individually convenient times, each recipient can decide whether to form a streaming session with the media server 22 in order to retrieve new media content made available by the particular content provider. This also represents an example of a multicasting approach to streaming using the multimedia messaging system according to the invention.

According to an alternative embodiment of the invention, the presentation description information can be stored in a server other than the MMS server 23 or the media server 22, for example in an e-mail or Web-server. In this embodiment, the notification message sent to the receiver 24 identifies the particular server on which the presentation description information is stored and an access mechanism (HTTP GET, WSP GET, IMAP4, POP3, RTSP DESCRIBE) can be used to retrieve the presentation description information from that location. Then the receiver 24 retrieves the presentation description information from the server identified in the notification message using the specified access mechanism. The presentation description information thus retrieved then guides the receiver 24 to invoke phase 3 of the method for retrieving and playing the stored media content. If the server used to store presentation description information is the MMS server 23, the existing MMS solution can be used directly to retrieve the presentation description information. In this situation, the MMS notification from the sender 21 to the MMS server 23 carries presentation description information and the presentation description information is stored in the MMS server 23. The notification from the server storing the presentation description to the receiver 24 then carries the location of the stored presentation description, the server address and other required information. Finally, the receiver 24 follows the MMS to retrieve the presentation description from the MMS server 23.

It should thus be noted that, in certain situations, the information content of the notification message sent from the sender 21 to the MMS server 23 may be different from that sent from the MMS server 23 to the receiver 24.

According to a preferred embodiment of the invention, if the senders 21 and receivers 24 are under the authority of different mutually linked MMS servers (that is they have different "serving" multimedia servers), the notification message is carried over the link between the MMS servers. The number of servers that may be linked together between serving MMS servers is not limited for any end-to-end notification.

There are existing protocols for both streaming control and media transport in the Internet domain. Phases 1 and 3 can thus be implemented based on these existing protocols.

In this way, the solution provided by the present invention also ensures interworking with the Internet, which is also an important objective of current MMS standard. Phase 2 conforms to existing MMS standards and thus provides backward compatibility with previously proposed mechanisms for non-streamed media content download.

Some practical approaches to accomplish the different phases of the preferred embodiment of the present invention are outlined below as examples.

The Real Time Streaming Protocol (RTSP) is a client-server streaming control protocol that enables controlled delivery of streamed multimedia data over an IP network. It is an application-level protocol and can work in conjunction with either the Transmission Control Protocol (TCP) or User Datagram Protocol (UDP). RTSP provides scope to use RTP (Real-time Transport Protocol)/UDP or any other lower level protocol for media transport. RTSP comprises a set of methods/instructions to control streamed audio and/or video. In this regard, the most useful methods/instructions are OPTIONS, DESCRIBE, ANNOUNCE, SETUP, PLAY, PAUSE, TEARDOWN, REDIRECT and RECORD. The media upload and download can be implemented using SETUP, PLAY, RECORD, PAUSE and TEARDOWN.

The Hypertext Transport Protocol (HTTP) can also be used to enable and control the uploading and downloading of media content according to the invention, using TCP as a transport protocol. HTTP has methods/instructions PUT and GET, corresponding to RECORD and PLAY in RTSP, which can be used for media uploading (phase 1) and downloading (phase 3).

UDP is a connectionless lightweight transport protocol providing communication with comparatively low latency. RTP is purposely designed for real-time communication and is implemented in such a way that it provides time-stamps and sequence numbers for data packets on top of UDP. Multicasting is possible using RTP. RTP is further designed to work in conjunction with the auxiliary control protocol RTCP (Real-time Control Protocol) to obtain feedback on the quality of data transmission and information about participants in an on-going session. Together, RTP and RTCP provide functionality and control mechanisms necessary for carrying real-time content and hence to enable streaming of media content and can thus be used in conjunction with the present invention.

TCP is a connection-orientated transport protocol. It ensures guaranteed and sequential reception of data packets at the cost of increased latency and larger overhead compared with UDP. Multicasting is not possible with TCP, but TCP can be used in streaming applications, if initial buffering time is not critical and the media clips to be streamed are comparatively short.

Figure 3:
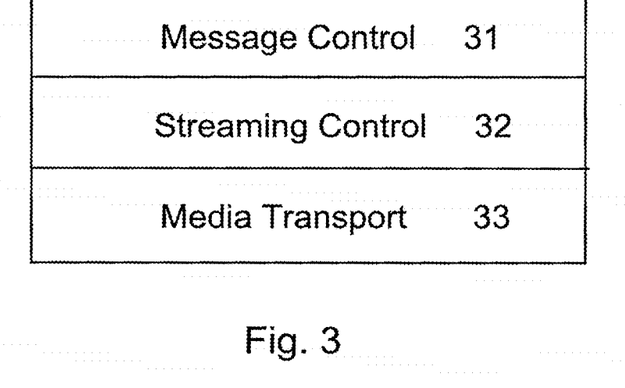
FIG. 3 shows the main protocol layers of streamed data transmission in the system of FIG. 2.

Message control functionality is required on top of streaming control and media transport layers in order to incorporate streaming in the MMS. FIG. 3 shows the main protocol layers of a streamed data transmission system according to FIG. 2. A message control layer 31 provides overall control of messaging functionality. For example, in the sender 21 the message control layer 31 is responsible for the assembly of media content into multimedia messages and formation of notification messages containing information describing the media content, which are subsequently sent to the intended receiver(s) 24. In the receiver 24, the message control layer 31 is responsible for interpreting received notification messages, extracting information relating to the location of media content to be streamed and information necessary to form streaming sessions to retrieve the media content. The message control layer 31 is also responsible for controlling the transmission and reception of any media content that is not to be streamed and/or is not of a type suitable for streaming, according to existing MMS.

A streaming control layer 32 is controlled by the message control layer 31. It is responsible for forming a streaming session for each type of media content to be streamed, according to information provided by the message control layer 31, or according to predefined rules for each media type. It is also responsible for controlling/regulating the streaming of media content once a streaming session is established. In the sender 21, the streaming control layer 32 is responsible for streamed uploading of media content to a media server 22 and conversely, in the receiver 24, it is responsible for controlling the streamed downloading of media content from the media server 22. Alternatively, streaming control functionality may be provided in the media server 22 in a situation, for example, in which streaming is performed in phase 1 and 3 in such a way as to provide real-time or near real-time streaming of media content between senders 21 and receivers 24. A media transport layer 33 handles the actual transportation of data using an appropriate transport protocol. The choice of protocol may be predefined for different media types or may be indicated to the media transport layer 33 via the message control and streaming control layers 31, 32 in accordance with information provided in the notification message. In a preferred embodiment, the media streaming control adapts the streaming in accordance with the data transmission channel condition as notified by the media transport layer 33.

Figure 4:
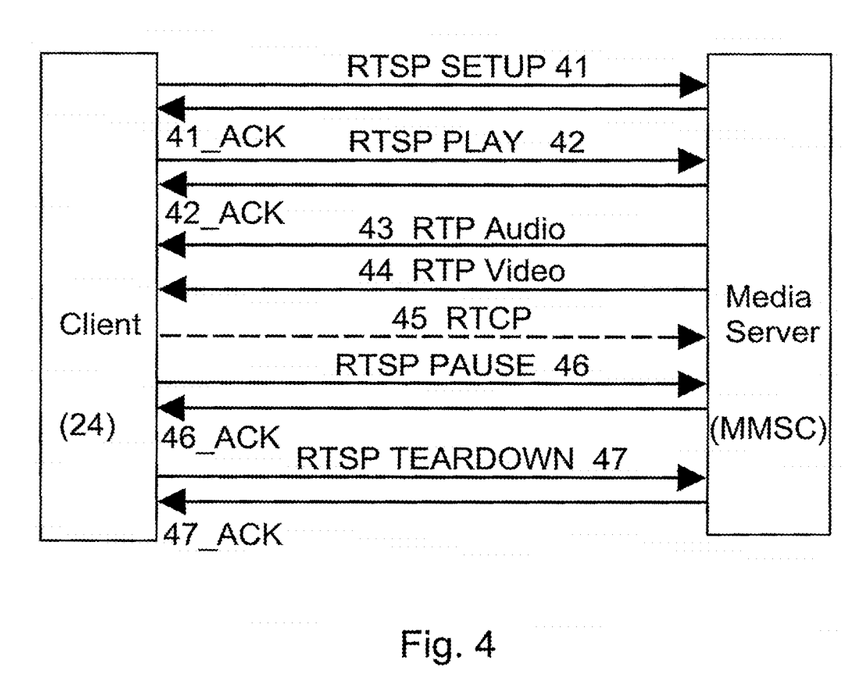
FIG. 4 shows the structure of messages sent during streamed data transmission between a receiver and a media server according to the preferred embodiment of the invention.

FIG. 4 shows the structure of different control messages sent between the receiver 24 and an MMSC (or media server 22) during a streamed media content download according to a preferred embodiment of the invention. It illustrates the flow of information to enable a media clip to be played in the receiver 24 using an RTSP session while using RTP/RTCP as a transport protocol. This gives an example of an approach that can be used for downloading a media clip in phase 3 of the present invention. The control messages sent to the receiver 24 are next explained.

The receiver 24 requests for the media content it has been notified about in phase 2. The receiver 24 sends to the MMSC an RTSP setup message (41) for setting up a streaming session, and receives a corresponding acknowledgement (41_ACK). The receiver 24 next sends an RTSP play instruction message (42) to the MMSC, and receives a corresponding acknowledgement (42_ACK). In response to the play instruction, the MMSC starts sending RTP audio (43) and RTP video (44) content to the receiver 24, according to the multimedia message being sent. The receiver 24 may control the MMSC's sending of the media content by an RTCP message (45). Once the user of the receiver 24 desires to pause the streaming downloading of content, he or she requests for pausing the streaming and, responsively, the receiver 24 sends an RTSP pause message (46) to the MMSC, and receives a corresponding acknowledgement (46_ACK). Responsive to the RTSP pause message, the MMSC pauses the sending of the media content (RTP audio and RTP video). Next, an RTSP teardown message (47) is sent from the receiver 24 to the MMSC to end the RTP session, allowing the streaming be continued on a later occasion. A corresponding acknowledgement message (47_ACK) is returned by the MMSC to the receiver 24.

By replacing the PLAY instruction with RECORD, a similar session suitable for media uploading in phase 1 of the invention can be implemented, wherein in place of the receiver 24 there is the sender 21.

End-to-end notification is required for message control functionality because, as explained previously, the receiver 24 requires certain information concerning the media content to be streamed in order to take part in a streaming session. According to current MMS specifications, information describing media content is encapsulated together with the media content itself and thus cannot be sent independently to the receiver 24. In the absence of such information, the receiver 24 is unable to download the media content by streaming. By providing separate end-to-end communication of media presentation information, the method according to the invention supplies the receiver 24 with the information it requires in order to download media content by streaming. Furthermore, the existing non-streaming MMS protocol has scope to allow communication of media presentation information using end-to-end messaging via an MMS server, rendering the method according to the invention compatible with current MMS standards.

RTSP is believed to represent a best mode for enabling and controlling streaming in phases 1 and 3. A certain degree of compromise in performance is required if RTP/UDP or TCP is used as a media transport protocol. Specifically, implementations using TCP do not provide multicasting functionality, as TCP is a connection orientated protocol. Nevertheless, TCP represents a viable alternative media transport protocol that can be used in connection with the present invention. Indeed, its connection-orientated nature may provide advantages in certain situations, particularly if a more secure streaming connection is desired. According to the preferred embodiment of the invention, the existing MMS protocol is used to provide end-to-end notification of presentation description information from the sender 21 to the receiver 24 via the MMSC in phase 2.

Figure 5:
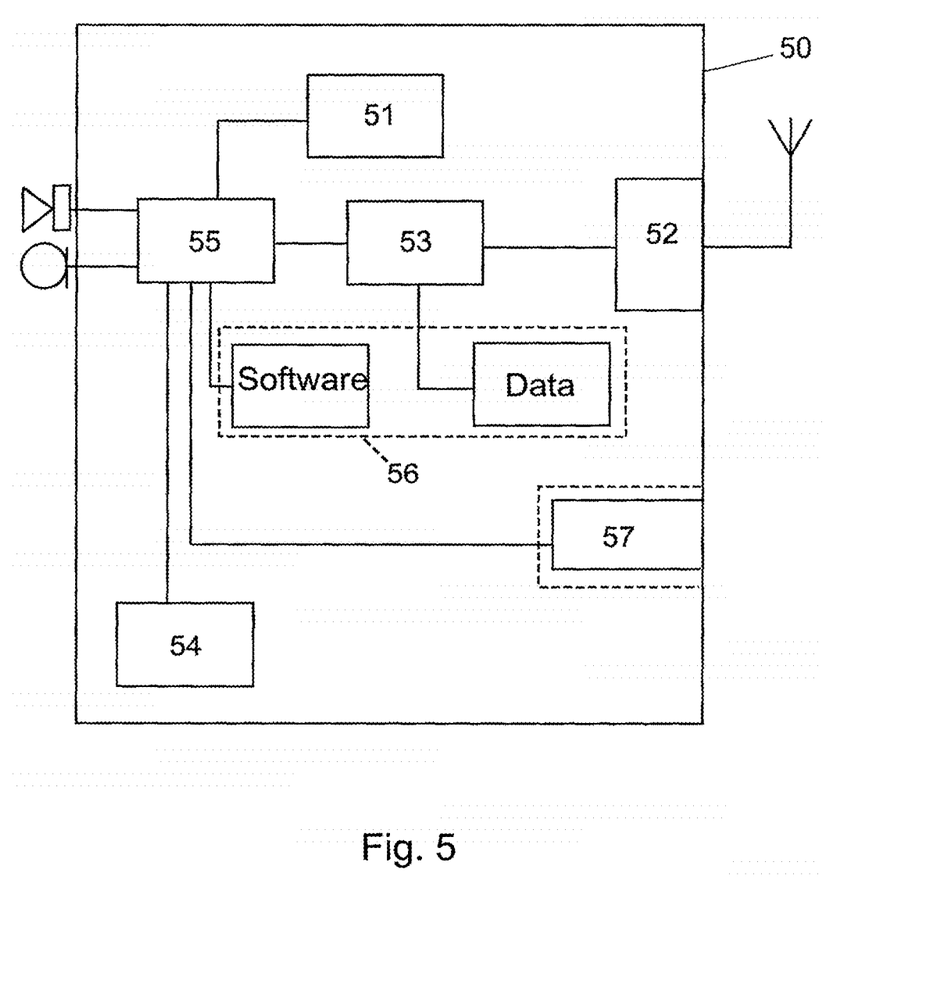
FIG. 5 shows a block diagram of a mobile communications terminal incorporating a cellular radiotelephone according to a preferred embodiment of the invention.

FIG. 5 shows a block diagram of a mobile terminal 50 (capable to be either the sender 21 or the receiver 24) incorporating a cellular radiotelephone. The mobile terminal 50 comprises a display 51, a transceiver 52 for transmitting and receiving radio signals, a digital signal processor (DSP) 53 for processing data and voice into and from the radio signals, a user input device such as a keypad or keyboard 54, and a central processing unit 55, the operation of which is controlled by software. The mobile terminal 50 further comprises a memory 56 for storing data and the software. The memory is used by the DSP 53 and the CPU 55. The software comprises an operating system and applications for controlling the operation of the mobile terminal 50 and for providing certain functionality, such as MMS. The mobile terminal 50 also comprises a removable smart card such as a SIM 57 for subscriber identification. The portion of the memory 56 that is dedicated to storing applications is so-called non-volatile memory that retains its contents even if the mobile terminal's power supply becomes depleted. The applications can be stored in any manner known in the art, including factory installation, storing from a personal computer and downloading over the air, for example from a server in a communications network. All of these techniques are known, for example, from the Nokia® 9110 Communicator.

Figure 6:
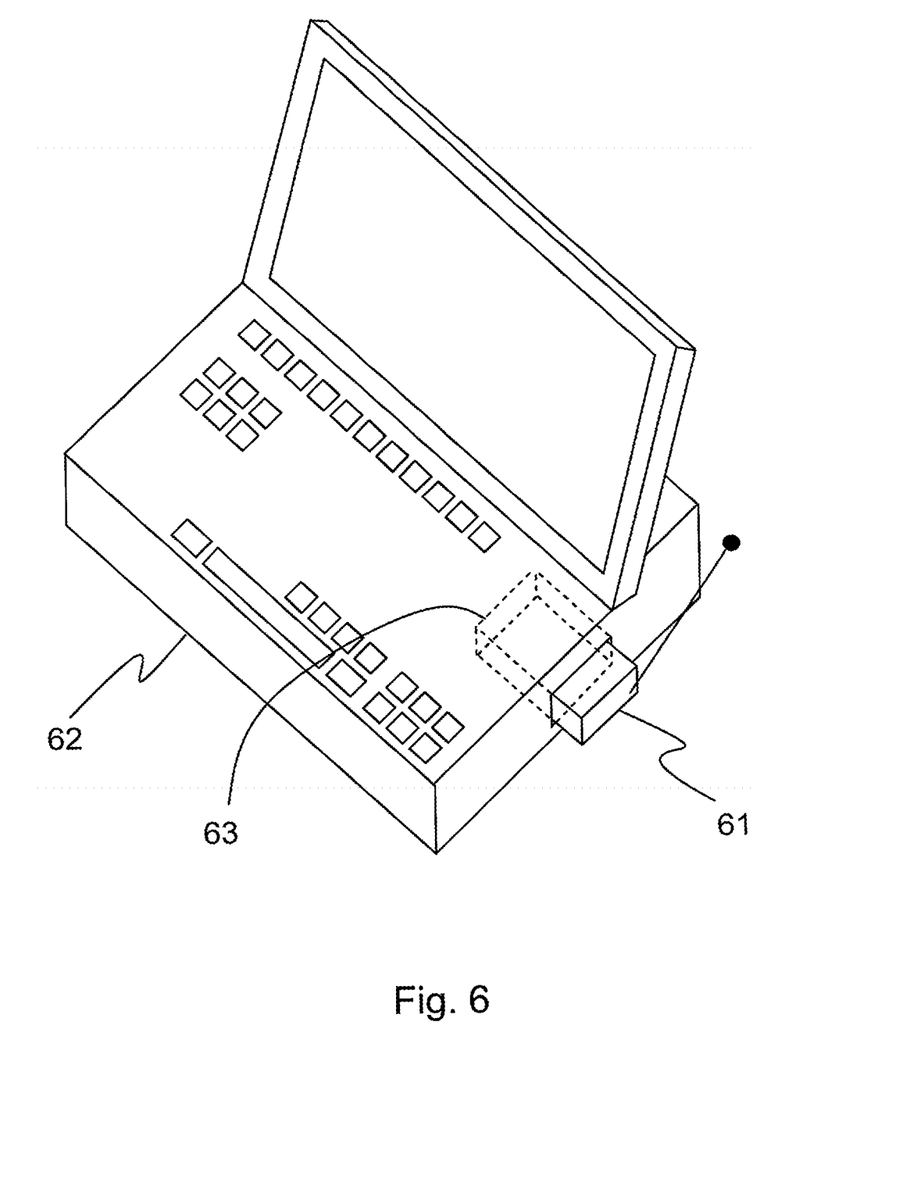
FIG. 6 shows a radio adapter card for a laptop PC according to an alternative embodiment of the invention.

FIG. 6 shows a radio adapter card 61 for a laptop PC 62 according to an embodiment of the invention, capable of acting as the sender 21 and as the receiver 24. The radio adapter card is fitted into a PCMCIA-slot of the laptop PC 62 (PCMCIA, Personal Computer Memory Card International Association).

While the invention has been described in relation to its implementation in a communications network in which at least part of the network comprises a radio communication link, it should be emphasised that its use is not in any way limited to this kind of network. The invention may equally well be implemented in networks where the physical connections between the various elements of the network (sender 21, receiver 24 and network servers) are implemented partially or entirely by means of fixed line connections.

The operation of the servers and terminals involved with different embodiments of the invention, such as the MMSC, the sender 21 and the receiver 24, is preferably controlled by computer program products causing these entities to operate according to the invention.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A multimedia message service center in a communication system, comprising:
    at least one multimedia message server at an apparatus in the communication system, configured to:
        send a notification message to a receiving device, the notification message indicating availability of a streamable media content and including presentation description information related to streaming of the streamable media content; and
    a media server at an apparatus in the communication system, the media server indicated in the notification message and configured to:
        establish an upload streaming session with the sending device; and
        upload and store streamable media content from the sending device in the upload streaming session;
        establish a download streaming session with the receiving device based on the presentation description information in the notification message;
        download the stored streamable media content to the receiving device in the download streaming session; and
    wherein the media server is configured to upload and store at least a portion of the streamable media content in the uploading streaming session simultaneously with downloading at least a portion of the stored streamable media content in the download streaming session;
    and wherein the multimedia message server sends the notification message to the receiving device after the media server stores a portion of the streamable media content uploaded from the sending device.

2. The multimedia message service center of claim 1, wherein the presentation description information comprises one or more of:
    a network address of the media server,
    information about an access mechanism for accessing the streamable multimedia content from the media server,
    a type of the media content,
    an encoding scheme used to encode the media content, and
    an indication of a transport protocol to be used to access the media content from the media server.

3. The multimedia message service center of claim 1, wherein the presentation description information comprises:
  identification of a server at which information for establishing a streaming session with the media server is located; and
  an access mechanism for retrieving the information from the identified server.

4. The multimedia message service center of claim 1, wherein the presentation description information comprises information sufficient for the receiving device to download the streamable media content by streaming.

5. The multimedia message service center of claim 1, wherein the at least one multimedia message server and the media server are merged into a single network entity.

6. The multimedia message service center of claim 1, wherein the at least one multimedia message server and the media server are different network entities from one another.

7. The multimedia message service center of claim 6, wherein the at least one multimedia message server and the media server are located at different geographic locations from one another.

8. The multimedia message service center of claim 1, wherein the media server is configured to download the stored streamable media content to the receiving device as a sequence of content sub-parts.

9. The multimedia message service center of claim 1, wherein the media server is configured to download the stored streamable media content to the receiving device using Hypertext Transport Protocol (HTTP).

10. A method of streaming media content received at a multimedia message service center from a sending device, to a receiving device, comprising:
  establishing an upload streaming session with the sending device;
  uploading and storing streamable media content from the sending device in the upload streaming session;
  after storing a portion of the streamable media content uploaded from the sending device, sending a notification message to the receiving device, the notification message indicating availability of the streamable media content and including presentation description information related to streaming of the streamable media content;
  establishing a download streaming session with the receiving device based on the presentation description information in the notification message; and
  downloading the stored streamable media content to the receiving device in the download streaming session simultaneously with the uploading and storing of at least a portion of the streamable media content from the sending device.

11. The method of claim 10, wherein the multimedia message service center comprises:
  at least one multimedia message server, configured to perform the step of sending the notification message; and
  a media server, configured to perform the establishing, uploading and storing, and downloading steps.

12. The method of claim 11, wherein the presentation description information comprises one or more of:
  a network address of the media server,
  information about an access mechanism for accessing the streamable multimedia content from the media server,
  a type of the media content,
  an encoding scheme used to encode the media content, and
  an indication of a transport protocol to be used to access the media content from the media server.

13. The method of claim 11, wherein the presentation description information comprises:
  identification of a server at which information for establishing a streaming session with the media server is located; and
  an access mechanism for retrieving the information from the identified server.

14. The method of claim 10, wherein the presentation description information comprises information sufficient for the receiving device to download the streamable media content by streaming.

15. The method of claim 10, wherein the downloading step comprises:
  downloading the stored streamable media content to the receiving device as a sequence of content sub-parts.

16. The method of claim 10, wherein the downloading step comprises:
  downloading the stored streamable media content to the receiving device using Hypertext Transport Protocol (HTTP).

* * * * *